United States Patent [19]

Komai et al.

[11] 3,893,986

[45] July 8, 1975

[54] PROCESS FOR THE PREPARATION OF NOVEL HYDROCARBON RESINS

[75] Inventors: Hisataka Komai; Atsuo Ishikawa; Hidemi Tsubaki, all of Kawasaki, Japan

[73] Assignee: Nippon Zeon Co. Ltd., Tokyo, Japan

[22] Filed: Oct. 5, 1973

[21] Appl. No.: 404,023

[30] Foreign Application Priority Data
Oct. 12, 1972  Japan.............................. 47-102154

[52] U.S. Cl. ............... 260/80.7; 260/5; 260/27 BB; 260/28.5 B; 260/33.6 UA; 260/33.8 UA; 260/82; 260/878 R
[51] Int. Cl. ............................................. C08f 1/72
[58] Field of Search............................ 260/80.7, 82

[56] References Cited
UNITED STATES PATENTS

| | | | |
|---|---|---|---|
| 2,963,467 | 12/1960 | Small | 260/82 |
| 3,005,806 | 10/1961 | Fefer | 260/82 |

Primary Examiner—Stanford M. Levin
Attorney, Agent, or Firm—Bucknam and Archer

[57] ABSTRACT

A process for the preparation of novel hydrocarbon resins having excellent thermal stability and low melt viscosity which comprises polymerizing a mixture mainly of 1,3-pentadiene, cyclopentene and diisobutylene in the presence of Friedel-Crafts type acidic metal halide catalyst.

7 Claims, No Drawings

PROCESS FOR THE PREPARATION OF NOVEL HYDROCARBON RESINS

This invention relates to a process for the preparation of a novel hydrocarbon resin and more particularly it relates to a process for the preparation of an industrially useful hydrocarbon resin by polymerizing a monomeric mixture mainly of 1,3-pentadiene, cyclopentene and diisobutylene in the presence of an acidic metal halide.

It has heretofore been known that the cationic polymerization of 1,3-pentadiene gives polymers exhibiting various different properties. These polymers may be in the form of liquid, gel or the like and was employable for specific uses depending on their specific properties. However, they were not found valuable in the industrial field in which rosin and its derivatives, terpene resin or the like has been used. There have recently been made various attempts to produce improved polymers of 1,3-pentadiene with the result of development of such processes as follows:

A process for copolymerizing 1,3-pentadiene and 2-methyl-2-butene (Japanese Pat. Gazette No. 12306/70), and A process for copolymerizing 1,3-pentadiene, 1,3-butadiene, 2-methyl-1-butene and 2-methyl-2-butene (Japanese Pat. Gazette No. 1991/72).

Resinous polymers obtained by polymerizing 1,3-pentadiene by the use of these recently developed processes have come to be paid attention to as an industrially useful material which may be substituted for rosin or terpene resins.

It has been found by the present inventors that, in the course of their studies on cationic polymerization of 1,3-pentadiene, excellent hydrocarbon resins may be produced by the copolymerization of 1,3-pentadiene and cyclopentene. These resinous polymers were equivalent or superior to the conventionally used aliphatic petroleum resins in water repellency, adhesion, cohesive strength, peel strength, thermal stability and the like, while they are somewhat disadvantageous in compatibility with polyethylene, ethylenevinyl acetate copolymers, paraffin wax or the like and are troublesome to handle due to their high viscosity in their molten state. Thus, they still have not a few drawbacks to be overcome and have therefore been desired to be improved.

As a result of their studies made in an attempt to eliminate the aforesaid drawbacks by copolymerizing a third comonomer with 1,3-pentadiene and cyclopentene, the present inventors have found that the copolymerization of diisobutylene as the third comonomer with 1,3-pentadiene and cyclopentene gives excellent hydrocarbon resins, thus accomplishing this invention.

An object of this invention is to provide polymers which have a low melt viscosity and are excellent in thermal stability and in compatibility allowing the polymer and a paraffin wax, polyethylene, ethylene-vinyl acetate or the like to be dissolved in each other.

This object is achieved by polymerizing a monomeric mixture comprising 35 – 85 percent by weight of 1,3-pentadiene, 10 – 50 percent by weight of diisobutylene and 5 – 30 percent by weight of cyclopentene or polymerizing a mixture comprising not less than 80 parts by weight of said monomeric mixture and not more than 20 parts by weight of at least one other unsaturated hydrocarbon copolymerizable with said monomeric mixture, in the presence of a Friedel-Crafts type acidic metal halide catalyst.

Friedel-Crafts type acidic metal halides typically include the fluorides, chlorides, bromides and iodides of metals such as aluminum, boron and iron. Inter alia, aluminum halides such as aluminum chloride and bromide, and boron trifluoride are particularly preferable. The use of boron trifluoride.etherate, an alkylaluminum dihalide or the like which is liquid at ambient temperature, will produce a liquid polymer. Titanium tetrachloride is remarkably low in polymerizing activity as a Friedel-Crafts type catalyst. Most preferably, aluminum chloride is used.

In view of the fact that the contact of the monomeric mixture with the catalyst is important in the practice of polymerization reaction according to this invention, the catalyst may be used in the form of particles having a mesh size of usually 5 – 200, preferably 20 – 200. However, these mesh sizes are not limitative, and larger and smaller particles may also be used. Although the amounts of catalyst used are not particularly limiting, the catalyst is necessary to use in amounts enough to allow the polymerization reaction to take place. The amounts are usually in the range of from 0.1 to 5 percent, preferably from 0.5 to 2 percent, by weight of the total monomers. The catalyst may be incorporated in the monomeric mixture, and vice versa; where desired, both of them may concurrently be introduced to a reactor. The polymerization reaction, whether effected in a batch or continuous fashion, is carried out in the known manner.

The temperature of polymerization reaction may advantageously be controlled in the presence of a diluent since the reaction is usually an exothermic one. The diluents which may be used should be inert to the reaction and typically include aromatic hydrocarbons such as benzene, toluene, xylene and monochlorobenzene; aliphatic hydrocarbons such as pentane, hexane and heptane; and alicyclic hydrocarbons such as cyclohexane. However, the use of the aliphatic hydrocarbons as the diluent in the reaction of the monomeric mixture wherein 1,3-pentadiene is contained in a high concentration, will often give a gel-like polymer inconveniently. In order to avoid such inconvenience it is preferable to use a solvent containing aromatic hydrocarbons in amounts of at least 50 percent by weight thereof as the diluent. The solvents are used usually in amounts of 20 – 1000 parts by weight per 100 parts by weight of the monomeric mixture.

The monomeric mixture according to this invention comprises 35 – 85 percent by weight of 1,3-pentadiene, 5 – 30 percent by weight of cyclopentene and 10 – 50 percent by weight of diisobutylene. Diisobutylene is obtained by dimerizing isobutylene contained in a $C_4$ fraction or isobutylene produced as a by-product in the preparation of sec.-butyl alcohol, and the diisobutylene so obtained is composed mainly of 2,4,4-trimethylpentene-1 and 2,4,4-trimethylpentene-2. The use of a monomeric mixture comprising more than 50 percent by weight of diisobutylene or more than 30 percent by weight of cyclopentene and, in addition, less than 35 percent by weight of 1,3-pentadiene, will lower the monomeric mixture in polymerizing activity and produce a polymer having a low softening point. Furthermore, the use of a monomeric mixture comprising more than 85 percent by weight of 1,3-pentadiene will make unstable a polymerization system in which this mixture is used or will produce a gel-like polymer from the system. The diisobutylene contained in the monomeric mixture according to this invention is the most important constituent of this invention, and the object of this invention cannot be attained without diisobutylene being contained in the monomeric mixture used.

The monomeric mixture according to this invention may contain up to 20 percent, preferably up to 10 percent, by weight of other copolymerizable unsaturated hydrocarbons in addition to 1,3-pentadiene, cyclopentene and diisobutylene. Typical of said copolymerizable hydrocarbons are aliphatic mono- and diolefins having 4 to 6 carbon atoms such as butene, pentene, hexene, butadiene and isoprene; cyclic olefins such as cyclopentadiene and methylcyclopentadiene; and terpenes such as α-pinene, β-pinene and dipentene.

The polymerization reaction is effected at temperatures of usually −20° to 100°C, preferably 0° to 80°C, and the pressure of the reaction system may be equal to atmospheric pressure or may be higher or lower than it. The reaction time is not of critical nature and may generally vary from several seconds to 12 hours or longer. The thus-obtained reaction mixture (in which the resulting polymer is contained in solution) is subjected to the known usual treatments to remove therefrom the residual catalyst and then the unreacted hydrocarbons, solvent and low polymers produced, thereby obtaining a desired polymer.

The polymers obtained according to this invention have a Gardner color of not higher than 6 as determined from ASTM D-1544-63T, a softening point of 40° − 160°C as prescribed in JIS (Japanese Industrial Standard) K-2531 and a specific gravity of 0.95 − 1.00. They are resinous polymers which are soluble in aliphatic, aromatic and halogenated hydrocarbon solvents such as pentane, hexane, benzene, xylene and chloroform, as well as in carbon tetrachloride. The resinous polymers of this invention allow natural and various synthetic rubbers, synthetic resins such as polyethylene and ethylene-vinyl acetate copolymers, natural resins such as polyterpenes and rosin, and various waxes, to dissolve in each other.

The resinous polymers according to this invention may be incorporated especially in natural and various synthetic rubbers to provide these rubbers with excellent properties such as water repellency, adhesiveness, cohesive strength, peel strength, thermal stability. The blends so prepared are useful as an adhesive for adhesive tapes. The polymers are particularly remarkably effective in providing rubbers with adhesiveness when added to the rubbers. The polymers and thermoplastics (such as polyethylene and ethylene-vinyl acetate copolymer which have recently been used mainly for hot melt adhesives and coating materials) are excellently compatible with each other, and the polymers and paraffin or microcrystalline waxes are also excellently soluble in each other. Thus, in cases where they are compounded with said thermoplastics or waxes to obtain a composition for use as an adhesive or coating material, they allow the composition to be formed homogeneous and provided with adhesiveness effectively. The composition so formed may advantageously be used without being exposed to high temperatures owing to its low cloud point. Furthermore, the polymers according to this invention are effective in providing compositions containing them with easy fluidization when applied or coated because of their low melt viscosity. These advantageous features of this invention make it possible to avoid troubles heretofore caused by the use of the conventional hot melt type adhesive composition, which troubles are illustrated by various loses incurred by heating at high temperatures, that is, supply of large amount of heat; decomposition of adhesive compositions and bodies to be coated therewith, caused by thermal hysteresis; and change in melt viscosity and evolution of odor brought about by said decomposition. In addition, the specific excellent thermal stability of the resinous materials according to this invention allows compositions containing them to be stabilized in quality and prevented from aging by the use of less amounts of an anti-aging agent, thereby obtaining economical benefits.

This invention will be illustrated by the following Examples in which all the parts are by weight unless otherwise specified.

EXAMPLES 1 − 3

To a 3-liter glass flask were added 8.9 g of particulate aluminum chloride of not larger than a 40-mesh size and 1050 g of a mixed solvent containing toluene and isooctane in the ratio by weight of 80 : 20 to form a mixture which was agitated while being kept at a temperature lower than the predetermined one by 10°C. The mixture so obtained was slowly incorporated with 810 g of a mixture of hydrocarbons continuously over a time period of 60 minutes to form a polymerizing system. To prevent the system from being raised in temperature due to the exothermic reaction taking place therein, the system was maintained at the predetermined temperature while being cooled. After the completion of the incorporation of the mixture of hydrocarbons, the polymerizing system was further kept at the predetermined temperature while agitating it for 60 minutes and was then incorporated with 35 ml of a mixture containing methanol and a 28 percent ammonia water in the ratio by volume of 1 : 1 thereby to decompose the aluminum chloride. The particles produced by the decomposition in the reaction mixture were filtered out to obtain a filtrate which was transferred into a 3-liter glass flask. The flask so charged was heated under a stream of nitrogen to distil off the unreacted hydrocarbons and solvent and then raised to 230°C. To remove the low polymers produced by the reaction and still remaining solvent from the filtrate, saturated steam continued to be blown into the filtrate until hardly any oily layer was found in the distillate and then ceased to be blown. The molten residue was withdrawn from the flask onto an aluminum tray and allowed to stand for cooling at room temperature thereby obtaining a resinous material. In addition, none of gel-like materials was found in the inactivated catalyst separated by said filtration. The results are shown in Table 1.

The mixture of hydrocarbons used was as follows.

| Ingredient | Part | % |
|---|---|---|
| 1,3-pentadiene | 62.9 | 69.4 |
| Diisobutylene | 13.6 | 15.6 |
| Cyclopentene | 14.1 | 15.0 |
| Saturated hydrocarbons having 5–6 carbon atoms | 4.9 | |
| Unsaturated hydrocarbons having 5–6 carbon atoms | 4.5 | |
| Total | 100.0 | 100.0 |

Table 1

| Example | Reaction temp. (°C) | Yield (g) | *1 Yield rate (%) | Amount of low polymers (g) | *2 Softening point (°C) | *3 Gardner color | *4 Melt viscosity (cps) |
| --- | --- | --- | --- | --- | --- | --- | --- |
| 1 | 30 | 700 | 95.3 | 25.0 | 66.0 | 3 | 120 |
| 2 | 50 | 713 | 97.0 | 23.5 | 81.5 | 3 | 190 |
| 3 | 70 | 725 | 98.7 | 3.1 | 98.0 | 4 | 250 |

*1 Yield rate is a ratio between the weight of a resin (excluding low polymers) produced and the total weight of 1,3-pentadiene, diisobutylene and cyclopentene contained in a mixture of hydrocarbons used.
*2 Determined by the ring and ball method prescribed in JIS K-2531.
*3 Gardner color as prescribed in ASTM D1544-63T.
*4 Determined at 200°C by a Brookfield viscosimeter.

From Table 1 it is seen that with the increase in reaction temperature used there will be produced resinous products having a higher softening point and somewhat higher Gardner color and melt viscosity. In this case, however, the resinous products are still light in color and still low in melt viscosity as compared with those containing no diisobutylene.

EXAMPLES 4 – 7

A 3-liter glass flask was charged with 7.6 g of particulate aluminum chloride of not larger than a 40-mesh size and 880 g of a mixed solvent containing benzene and toluene in the ratio by weight of 80 : 20 to form a mixture which was heated and kept at 40°C under agitation. The mixture was slowly incorporated with 700 g of mixed hydrocarbons continuously over a period of time of 120 minutes, during which the resulting polymerizing system was kept at 45°C while being cooled to avoid undue heating by its exothermic reaction. After the end of the incorporation the system was successively kept at the same temperature as above under agitation for 30 minutes and then incorporated with 30 ml of a mixture composed of methanol and a 28 percent ammonia water in the ratio by volume of 1 : 1 to decompose the aluminum chloride. The reaction mixture so produced was filtered to remove therefrom the inactivated catalyst particles produced by the decomposition and obtain a filtrate which was transferred into a 3-liter glass flask wherein the filtrate was then treated in the same manner as in Example 1 to obtain a yellow-colored resinous material without production of gel-like materials in any one of the treating steps. The results are indicated in Table 2.

The mixtures of hydrocarbons used had the following compositions.

From Table 2 it is apparent that the addition of diisobutylene as one of the components of the mixed hydrocarbons will give resinous products having remarkably low melt viscosity.

EXAMPLES 8 – 9

A 5-liter glass flask was charged with 19.0 g of particulate aluminum chloride of a 40-mesh size or finer and 1670 g of a mixed solvent containing benzene and toluene in the ratio by weight of 80 : 20 to form a mixture which was kept at approximately 50°C under agitation. The mixture was slowly incorporated with 1476 g of a mixture of hydrocarbons continuously over a period of time of 120 minutes while keeping the whole mass at the predetermined temperature by cooling the mass to inhibit a raise in temperature otherwise caused by the exothermic reaction therein. After the end of the incorporation the mass was successively kept at the same temperature as above under agitation for 30 minutes and incorporated with 75 ml of a mixture containing methanol and a 28 percent ammonia water in the ratio by volume of 1 : 1, thereby decomposing the aluminum chloride. The reaction mixture so produced was filtered to remove therefrom the inactivated particulate catalyst produced by said decomposition while obtaining a filtrate which was then treated in accordance with the procedure of Example 1 thereby to obtain a yellow-colored resinous material without production of gel-like materials noticed.

| Ingredient | Mixture A Part | % | B Part | % | C Part | % | D Part | % |
| --- | --- | --- | --- | --- | --- | --- | --- | --- |
| 1,3-pentadiene | 59.3 | 65.4 | 51.8 | 57.2 | 44.4 | 49.0 | 37.0 | 40.8 |
| Diisobutylene | 18.1 | 20.0 | 27.2 | 30.0 | 36.2 | 40.0 | 45.3 | 50.0 |
| Cyclopentene | 13.2 | 14.6 | 11.6 | 12.8 | 10.0 | 11.0 | 8.3 | 9.2 |
| Saturated hydrocarbons having 5–6 carbon atoms | 4.9 | | 4.9 | | 4.9 | | 4.9 | |
| Unsaturated hydrocarbons having 5–6 carbon atoms | 4.5 | | 4.5 | | 4.5 | | 4.5 | |
| | 100.0 | 100.0 | 100.0 | 100.0 | 100.0 | 100.0 | 100.0 | 100.0 |

Table 2

| Example | Mixture | Yield (g) | Yield rate (%) | Amount of low polymers (g) | Softening point (°C) | Gardner color | Melt viscosity at 200°C (cps) |
| --- | --- | --- | --- | --- | --- | --- | --- |
| 4 | The same composition as in Examples 1 – 3 | 549 | 86.8 | 25.1 | 105.5 | 3 | 355 |
| 5 | A | 533 | 84.4 | 30.4 | 101.0 | 3 | 320 |
| 6 | B | 490 | 77.5 | 35.8 | 93.5 | 4 | 165 |
| 7 | C | 463 | 73.3 | 36.6 | 89.5 | 4 | 115 |
| | D | 453 | 71.5 | 42.5 | 82.0 | 4 | 100 |

The mixtures of hydrocarbons used had the following compositions.

|  | E | | F | |
|---|---|---|---|---|
|  | Part | % | Part | % |
| 1,3-pentadiene | 59.3 | 65.4 | 55.5 | 61.3 |
| Diisobutylene | 13.6 | 15.0 | 18.1 | 20.0 |
| Cyclopentene | 13.2 | 14.6 | 12.4 | 13.7 |
| Isoprene | 4.5 | 5.0 | 4.5 | 5.0 |
| Saturated hydrocarbons having 5–6 carbon atoms | 4.9 | | 5.0 | |
| Unsaturated hydrocarbons having 5–6 carbon atoms | 4.5 | | 4.5 | |
|  | 100.0 | 100.0 | 100.0 | 100.0 |

Table 3

| Example | Mixture | Reaction temp. (°C) | Yield | Yield rate (%) | Amount of low polymers (g) | Softening point (°C) | Gardner color | Melt viscosity at 200°C (cps) |
|---|---|---|---|---|---|---|---|---|
| 9 | E | 45 | 980 | 91.0 | 60.8 | 101.0 | 3 | 270 |
| 10 | F | 55 | 940 | 70.0 | 77.7 | 97.0 | 3 | 255 |

From Table 3 it is seen that the use of small proportions of isoprene in the mixture of hydrocarbons as one component thereof will have no essential effect on the color and melt viscosity of resinous materials to be obtained.

COMPARATIVE EXAMPLE 1

A 3-liter glass flask was charged with 7.8 g of particulate aluminum chloride of a 40-mesh size or finer and 930 g of a mixed solvent comprising toluene and isooctane in the ratio by weight of 80 : 20 to form a mixture which was kept at 40°C under agitation. The mixture so formed was slowly incorporated with 664 g of a mixture of hydrocarbons continuously over a period of time of 60 minutes to prepare a polymerizing system which was kept at 50°C while cooling it to cancel the heat evolved by the exothermic reaction thereof. After the completion of the incorporation the polymerizing system was successively kept at 50°C for 30 minutes and incorporated with 30 ml of a mixture containing methanol and a 28 percent ammonia water in the ratio by volume of 1 : 1 thereby to decompose the aluminum chloride. The reaction mixture so produced was filtered to remove therefrom the inactivated catalyst particles while obtaining a filtrate. The filtrate was transferred into a 3-liter glass flask and then treated in the same manner as in Example 1 thereby obtaining 513 g of a resinous material in a yield of 77.3 percent. The low polymers recovered amounted to 6.2 g. The resinous material so obtained had a Gardner color of 3, softening point of 89.0°C and melt viscosity of 351 centipoise at 200°C. There were found no gel-like materials produced.

The mixture of hydrocarbons used had the following composition.

| Ingredient | Part | % |
|---|---|---|
| 1,3-pentadiene | 70.2 | 77.6 |
| Diisobutylene | 4.5 | 5.0 |
| Cyclopentene | 15.7 | 17.4 |
| Saturated hydrocarbons having 5–6 carbon atoms | 4.9 | |
| Unsaturated hydrocarbons having 5–6 carbon atoms | 4.5 | |
| Total | 100.0 | 100.0 |

From the aforesaid results it is seen that the use of diisobutylene in amounts smaller than those according to this invention will give a resinous material having a remarkably high melt viscosity.

COMPARATIVE EXAMPLE 2

To a 3-liter glass flask were added 880 g of benzene and 7.6 g of particulate aluminum chloride of a 40-mesh size or finer to form a mixture which was kept at 25°C under agitation. The mixture was slowly incorporated with 690 g of a mixture of hydrocarbons continuously over a period of time of 60 minutes while cooling so that the resulting polymerizing system was kept at a reaction temperature of 30°C. Ten minutes after the end of said incorporation, the system produced gel-like materials and increased in viscosity. After further agitated for 20 minutes, the system was incorporated with 30 ml of a mixture composed of methanol and a 28 percent ammonia water in the ratio by volume of 1 : 1 thereby decomposing the aluminum chloride. The system was filtered to remove the inactivated catalyst particles and gel-like materials (the thus-removed mass weighing 261 g) while obtaining a filtrate. The filtrate was introduced to a 3-liter glass flask, heated under a stream of nitrogen to distil the unreacted hydrocarbons and solvent and then raised to 200°C under a stream of nitrogen for 4 hours to distil off the low polymers produced by the polymerization. The molten residue so obtained was transferred onto an aluminum tray and then let to cool to room temperature thereby obtaining 400 g of a yellow-colored resinous material in a yield of 61.0 percent. This resin had a Gardner color of 4, softening point of 82.0°C and melt viscosity of 330 centipoise at 250°C.

The mixture of hydrocarbons mentioned above had the following composition.

| Ingredient | Parts | % |
|---|---|---|
| 1,3-pentadiene | 85.1 | 86.0 |
| Diisobutylene | 5.0 | 5.0 |
| Cyclopentene | 9.0 | 9.0 |
| Saturated hydrocarbons having 5–6 carbon atoms | 0.9 | |
| Total | 100.0 | 100.0 |

From the results of the Comparative Example 2, it is seen that the use of more than 85 percent by weight of 1,3-pentadiene and less than 10 percent by weight of diisobutylene will render unstable a polymerizing system wherein these monomers are used, thereby producing gel-like polymers.

Experiment 1

The hydrocarbon resins obtained in Examples 5, 7 and Comparative Example 2, as well as terpene resins, and rosin derivatives were tested for their thermal stability with the result being indicated in Table 4. It is to be noted that the resins obtained in said Examples and Comparative Example were not incorporated with an antioxidant.

Table 4

|  | Degree of[5] ethylenic unsaturation (%) | Softening point (°C) | Softening point after heating to 180°C for 24 hours (°C) | Gardner color | Gardner color after heating to 180°C for 24 hours |
|---|---|---|---|---|---|
| Example 5 | 5.3 | 101.0 | 101.0 | 3 | 11 |
| Example 7 | 3.3 | 89.5 | 89.0 | 4 | 11 |
| Comparative Example 1 | 8.5 | 89.0 | 98.5 | 4 | 13 |
| Piccolyte[6] S-115 | 3.6 | 114.0 | 100.0 | 3 | 12 |
| Ester gum H[7] | — | 78.5 | 82.0 | 6 | 13 |

[5] Ratio between number of hydrogen atoms related to double bonds and number of the total of hydrogen atoms in hydrocarbon resin, the ratio being determined by nuclear magnetic resonance spectrometry.
[6] Terpene resin, produced by Pensylvania Industrial Chemical Corp.
[7] Glycerine ester of hydrogenated rosin.

Table 5

| Hydrocarbon resin | Melt viscosity at 170°C (cps) | Transparency in the molten state at 170°C | Flexibility at room temperature | Cloud point (°C) |
|---|---|---|---|---|
| Example 1 | 455 | Excellent | Very good | 116 |
| Example 2 | 380 | Very good | '' | 128 |
| Example 3 | 430 | Excellent | Excellent | 116 |
| Example 4 | 450 | Very good | Very good | 150 |
| Example 5 | 350 | Excellent | '' | 130 |
| Example 6 | 320 | '' | Excellent | 91 |
| Example 7 | 310 | '' | '' | 72 |
| Example 8 | 310 | '' | '' | 63 |
| Example 9 | 430 | '' | '' | 115 |
| Example 10 | 430 | '' | '' | 94 |
| Comparative Example 1 | 560 | Good | Good | >170 |
| Comparative Example 2 | 680 | Good | Good | >170 |
| Piccolyte S-115 | 455 | Excellent | Excellent | 107 |
| Ethylene vinyl acetate copolymer/ paraffin wax —1/1 |  |  |  | 68 |

As is seen from Table 4, the hydrocarbon resins according to this invention are superior in thermal stability and, surprisingly, they hardly change in softening point in spite of using no antioxidant therein.

Experiment 2

In order to evaluate the usefulness of the hydrocarbon resins in the preparation of hot melt compositions, 100 parts of ethylene-vinyl acetate *[8], 100 parts of 145°F paraffin wax*[9] and 100 parts of each of hydrocarbon resins (as indicated in Table 5), were melt mixed together. The mixtures so obtained were tested for their melt viscosity and observed to see their compatibility with each other.

[8] Evaflex No. 210 (produced by Mitsui Polychemical Co., Ltd.) Content of vinyl acetate: 28%; Melt index: 400 g/10 min. (as determined from ASTM D-1238-70)
[9] Paraffin wax SP 45 (produced by Nippon Seiro Co., Melting point 144°F (as determined from JIS K2521)

In order to find their compatibility, the mixtures were melted at 170°C to see their transparency and they were further observed to see their flexibility at room temperature. Thus, the compatibility was expressed in terms of the transparency and flexibility as indicated in Table 5. The mixtures were further tested for cloud point which constitutes an important measure of compatibility, in accordance with JIS (Japanese Industrial Standard) K2266. The results are shown in Table 5.

Table 5 indicates the following:

The hydrocarbon resins according to this invention when used in the preparation of a composition, will permit the resulting composition to keep its melt viscosity at a low level owing to their intrinsic low melt viscosity. The composition exhibits high transparency in its molten state and keeps flexibility similar to that of glue in its solid state at room temperature owing to the fact that the components of the composition are excellently compatible with each other. The excellent compatibility is further substantiated by the low cloud points shown in Table 5. These characteristics indicate that the hydrocarbon resins according to this invention may advantageously be incorporated in hot melt adhesives and coating materials. In other words, the low melt viscosity of the composition is conducive to increasing the fluidity thereof at the time of application, and the excellent compatibility of the composition is of service in improving it in various properties necessary for an adhesive.

What is claimed is:

1. A process for the preparation of hydrocarbon solvent-soluble hydrocarbon resins, characterized by polymerizing a monomeric mixture comprising 35 – 85 percent by weight of 1,3-pentadiene, 5 – 30 percent by weight of cyclopentene and 10 – 50 percent by weight of diisobutylene, in the presence of a Friedel-Crafts type acidic metal halide catalyst.

2. A process according to claim 1, wherein the monomeric mixture comprises at least one other unsaturated hydrocarbon copolymerizable therewith in amounts of not more than 20 percent by weight thereof.

3. A process according to claim 1, wherein the Friedel-Crafts type acidic metal halide catalyst is a member selected from the group consisting of fluorides, chlorides, bromides and iodides of aluminium, boron and iron.

4. A process according to claim 1, wherein the Friedel-Crafts type acidic metal halide catalyst is aluminum chloride.

5. A process according to claim 2, wherein the other unsaturated hydrocarbon is a member selected from the group consisting of butene, pentene, hexene, butadiene, isoprene, cyclopentadiene, methylcyclopentadiene, $\alpha$-pinene, $\beta$-pinene and dipentene.

6. A process according to claim 1, wherein the polymerization is effected at temperatures of from $-20°C$ to $100°C$.

7. A process according to claim 1, wherein the polymerization is effected in the presence of a solvent containing aromatic hydrocarbons in amounts of at least 50 percent by weight thereof.

* * * * *